(12) United States Patent
Takakusaki

(10) Patent No.: US 6,684,990 B2
(45) Date of Patent: Feb. 3, 2004

(54) TUBE STRUCTURE AND TUBE MANUFACTURING METHOD FOR HYDRAULIC DAMPER

(75) Inventor: Toshiyuki Takakusaki, Saitama (JP)

(73) Assignees: Showa Corporation (JP); Honda Giken Kogyo Kabushiki Kaisha (JP)

( * ) Notice: Subject to any disclaimer, the term of this patent is extended or adjusted under 35 U.S.C. 154(b) by 116 days.

(21) Appl. No.: 09/944,611

(22) Filed: Aug. 31, 2001

(65) Prior Publication Data

US 2002/0027050 A1 Mar. 7, 2002

(30) Foreign Application Priority Data

Sep. 1, 2000 (JP) ........................................ 2000-265876

(51) Int. Cl.⁷ .................................................. F16F 9/00
(52) U.S. Cl. ............ 188/321.11; 188/313; 188/322.14; 188/322.16; 267/64.11; 280/124.155
(58) Field of Search ............................ 188/321.11, 297, 188/313, 314, 315, 316, 322.13, 322.14, 322.16, 322.17; 267/64.11, 64.15, 64.13; 280/124.155, 124.154, 124.146, 124.147

(56) References Cited

U.S. PATENT DOCUMENTS

| 4,744,444 A | * | 5/1988 | Gillingham .................. 188/315 |
| 4,838,392 A | * | 6/1989 | Miller et al. ................. 188/277 |
| 5,040,645 A | * | 8/1991 | Volpel et al. ................ 188/267 |
| 5,178,239 A |   | 1/1993 | Homme ....................... 188/315 |
| 5,607,035 A | * | 3/1997 | Fulks et al. ............. 188/322.19 |
| 5,848,676 A |   | 12/1998 | Deigner ................. 188/321.11 |

FOREIGN PATENT DOCUMENTS

JP            11182610            7/1999

* cited by examiner

Primary Examiner—Pam Rodriguez
(74) Attorney, Agent, or Firm—Orum & Roth

(57) ABSTRACT

In a tube structure of a hydraulic damper, an outer tube and an inner tube are separately formed by extrusion, and using this outer tube or inner tube, as it has ribs integrally formed on an inside wall of the outer tube or outside wall of the inner tube, the inner tube is inserted into the outer tube, and the outer tube is forced to be reduced in diameter so that the outer tube is compression-joined onto the inner tube, whereby the outer and inner tubes and are integrally joined

4 Claims, 10 Drawing Sheets

TUBE STRUCTURE AND TUBE MANUFACTURING METHOD FOR HYDRAULIC DAMPER

BACKGROUND OF THE INVENTION

1. Field of the Invention

The present invention relates to a tube structure and a tube manufacturing method for a hydraulic damper.

2. Description of the Related Art

A. In a conventional tube structure for a hydraulic damper, as disclosed in Japanese Patent Application Laid-Open Publication No. 11-182610, by a drawing formation or extrusion formation such as of an aluminum alloy, an outer circumferential wall of an inner tube is integrally joined to an inner circumferential wall of an outer tube, via ribs. According to a tube structure with the integrated inner and outer tubes, because the outer tube is supported by the inner tube via ribs, the tubes' strengths are increased, and the inner and outer tube are centered by the ribs, with an enhanced assembly workability.

However, there are the following problems:

(1) The size of a reservoir formed by a gap between the outer tube and the inner tube is subject to restriction of durability of jigs used for the formation, with a difficulty to render the outer tube diameter narrow to have a compact tube size with a necessary reservoir volume secured.

(2) The outer tube and the inner tube are unable to be made of different materials (different kinds of material or metal).

(3) Because the outer tube and the inner tube are completely integrated, a fraction of axial length of the outer tube by which upper and lower end parts of the outer tube protrude relative to upper and lower end parts of the inner tube generates a small resilient thrust force, with a difficulty for a shaft sealing part or a bottom piece to be ensured to be held by the thrust force between the inner tube and the outer tube.

It is an object of the present invention to implement a hydraulic damper with an enhanced tube strength and with a necessary volume secured for a reservoir chamber between an outer tube and an inner tube, allowing for a tube size to be compact, for the outer tube and the inner tube to be made of different materials as well, and for incorporated components between the inner tube and the outer tube to receive a great thrust force, to be held with ease in an ensured manner.

B. In a conventional hydraulic damper, as disclosed in Japanese Patent Application Laid-Open Publication No. 11-182610, an outer circumferential wall of an inner tube is integrally joined by ribs to an inner circumferential wall of an outer tube. This hydraulic damper has a shaft sealing part provided for a piston rod and fixed between an upper end part of the inner tube and an upper end part of the outer tube, and a bottom piece fixed between a lower end part of the inner tube and a lower end part of the outer tube.

According to the hydraulic damper of a tube structure with the integrated inner and outer tubes, the outer tube is supported by the inner tube via the ribs, allowing for the rigidity of the outer tube to be increased, and for the inner and outer tubes to be centered by the ribs, with an enhanced assembly workability.

However, there are the following problems:

(1) The shaft sealing part interposed between the inner and outer tubes, which are integrated with each other, is fixed simply by an elastic thrust force generated by a short fraction of axial length of the outer tube by which the upper end part of the outer tube projects above the upper end part of the inner tube, and an elastic thrust force generated by a seal constituting the shaft sealing part. Therefore, the thrust forces are small so that they may be lost by the difference in amount of thermal expansion due to a difference between a material (such as an aluminum alloy) of the outer tube and a material (such as a steel) of a rod guide constituting the shaft sealing part, as well as by deterioration of a rubber member about a core metal constituting the seal, resulting in a play at the shaft sealing part.

(2) Also, the bottom piece interposed between the inner tube and the outer tube may, like the shaft sealing part, have thrust forces lost by the difference in amount of thermal expansion between the outer tube and the bottom piece, resulting in a play at the bottom piece.

It is an object of the present invention to provide a hydraulic damper of a tube structure with integrated inner and outer tubes, allowing for thrust forces to be maintained on a shaft sealing part.

It is another object of the present invention to provide a hydraulic damper of a tube structure with integrated inner and outer tubes, allowing for thrust forces to be maintained on a bottom piece.

C. In a hydraulic damper of a tube structure with integrated inner and outer tubes, it is impossible for a sub-assembly with a bottom piece fitted in advance such as by compression-joining into an end part of the inner tube to be placed in the outer tube to be assembled. In a conventional art, therefore, after a bottom piece is fitted in an inner tube, a cap for holding the bottom piece is welded to an end part of an outer tube.

Accordingly, there are the following problems:

(1) Because of a welding process accompanied after incorporation of the bottom piece, welding spatters may go inside the outer tube, contaminating valves of the bottom piece, degrading the quality of a resultant hydraulic damper.

(2) As the welding is performed generally within a processing line for the inner and outer tubes, dust and the like may enter the inner and outer tubes in a material handling stage up to a subsequent assembly line for the inner and outer tubes having the bottom piece as well as the cap incorporated. It is very difficult to remove dust by cleaning inside of the inner and outer tubes having the bottom piece as well as the cap incorporated.

It is an object of the present invention to provide a hydraulic damper of a tube structure with integrated inner and outer tubes, which does not need a welding after a bottom piece is incorporated in the inner tube, allowing for the bottom piece to be incorporated in the inner tube on an assembly line, and for the quality of a resultant hydraulic damper to be raised with ease.

SUMMARY OF THE INVENTION

In accordance with the present invention, there is provided a tube structure for a hydraulic damper of a double tube structure including an outer tube and an inner tube, wherein the outer tube and the inner tube are separately formed by extrusion, respectively, and ribs are integrally formed on an inside wall of the outer tube or an outside wall of the inner tube to be used. The inner tube is inserted inside the outer tube and the outer tube is forced to be reduced in diameter to have the outer tube compression-joined onto the inner tube, whereby the outer tube and the inner tube are integrally joined.

Furthermore, there is provided a tube manufacturing method for a hydraulic damper of a double tube structure including an outer tube and an inner tube, comprising the steps of:

separately forming the outer tube and the inner tube by extrusion, respectively, with ribs integrally formed on an inside wall of the outer tube or an outside wall of the inner tube; and having the inner tube inserted inside the outer tube and a core bar inserted in the inner tube, diameter-reducing the outer tube to be compression-joined onto the inner tube to have the outer tube and the inner tube integrally joined.

Furthermore, there is provided a thrust force holding structure of a hydraulic damper in which an outer circumferential wall of an inner tube is integrally fastened by ribs to an inner circumferential wall of an outer tube, and a shaft sealing part for a piston rod to be inserted into the inner tube is fixed between an upper end part of the inner tube and an upper end part of the outer tube, wherein a compression spring member is interposed within a range sandwiching the shaft sealing part between the upper end part of the inner tube and the upper end part of the outer tube.

Furthermore, there is provided a thrust force holding structure of a hydraulic damper in which an outer circumferential wall of an inner tube is integrally fastened by ribs to an inner circumferential wall of an outer tube, and a bottom piece for partitioning an oil chamber inside the inner tube and a reservoir chamber between the inner tube and the outer tube is fixed between a lower end part of the inner tube and a lower end part of the outer tube, wherein a compression spring member is interposed within a range sandwiching the bottom piece between the lower end part of the inner tube and the lower end part of the outer tube.

Furthermore, there is provided a thrust force holding structure of a hydraulic damper in which an outer circumferential wall of an inner tube is integrally fastened by ribs to an inner circumferential wall of an outer tube, a shaft sealing part for a piston rod to be inserted into the inner tube is fixed between an upper end part of the inner tube and an upper end part of the outer tube, and a bottom piece for partitioning an oil chamber inside the inner tube and a reservoir chamber between the inner tube and the outer tube is fixed between a lower end part of the inner tube and a lower end part of the outer tube, wherein a compression spring member is interposed within a range sandwiching the shaft sealing part between the upper end part of the inner tube and the upper end part of the outer tube, and another compression spring member is interposed within a range sandwiching the bottom piece between the lower end part of the inner tube and the lower end part of the outer tube.

Furthermore, there is provided a bottom fixing structure of a hydraulic damper in which an outer circumferential wall of an inner tube is integrally fastened by ribs to an inner circumferential wall of an outer tube, and a bottom piece for partitioning an oil chamber inside the inner tube and a reservoir chamber between the inner tube and the outer tube is fixed between a lower end part of the inner tube and a lower end part of the outer tube, wherein the bottom piece is fitted in the inner tube, the bottom piece is held by a cap, and the cap is tightened to an end part of the outer tube, and fixed thereto by screw-fastening or press-fitting.

Furthermore, there is provided a bottom fixing structure of a hydraulic damper in which an outer circumferential wall of an inner tube is integrally fastened by ribs to an inner circumferential wall of an outer tube, and a bottom piece for partitioning an oil chamber inside the inner tube and a reservoir chamber between the inner tube and the outer tube is fixed between a lower end part of the inner tube and a lower end part of the outer tube, wherein the bottom piece is fitted in the inner tube, the bottom piece is held by a cap, the cap is fitted to an end part of the outer tube, and a fixing member for holding the cap is tightened to the end part of the outer tube, and fixed thereto by screw-fastening or press-fitting.

Furthermore, there is provided a bottom fixing structure of a hydraulic damper in which an outer circumferential wall of an inner tube is integrally fastened by ribs to an inner circumferential wall of an outer tube, and a bottom piece for partitioning an oil chamber inside the inner tube and a reservoir chamber between the inner tube and the outer tube is fixed between a lower end part of the inner tube and a lower end part of the outer tube, wherein a cap is fixed to one end part of the outer tube, the bottom piece is inserted from the other end part of the outer tube, the bottom piece is fitted in the inner tube, and the bottom piece is fastened to the cap.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

First Embodiment (FIG. 1 to FIG. 4)

Figure 1:
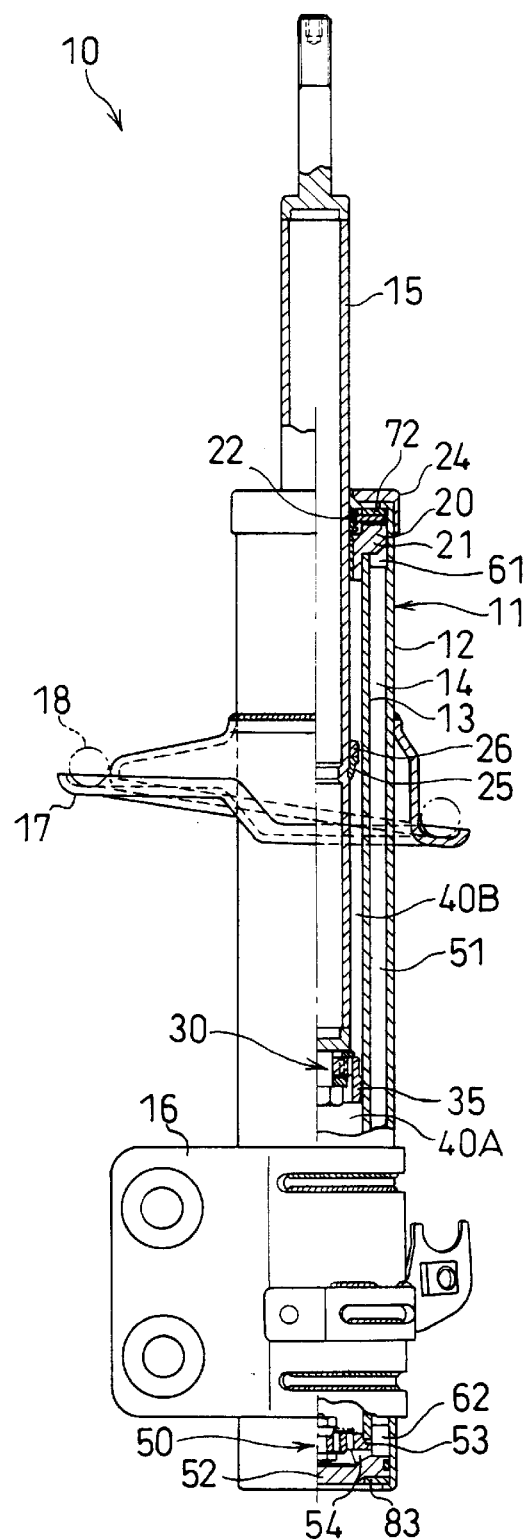
FIG. 1 is an elevation, in longitudinal section in half, of a hydraulic damper according to a first embodiment of the invention.

FIG. 1 shows a hydraulic damper 10 of a type having a plurality of tubes constituting a strut suspension, in which a damper tube 11 is constituted with a double tube structure having an outer tube 12 and an inner tube 13 (cylinder) joined coaxial to each other by later-described ribs 14. The hydraulic damper 10 has a hollow piston rod 15 inserted into the inner tube 13 which is installed in the outer tube 12, a mounting bracket (not shown) fixed to an upper end part of the piston rod 15 and linked to a vehicle body, and a knuckle bracket 16 for linking a lower end part of the outer tube 12 to a vehicle wheel end, to thereby constitute a vehicular suspension. The knuckle bracket 16 is wound on an outer circumference of the lower end part of the outer tube 12, and joined there.

The hydraulic damper 10 has a suspension spring 18 interposed between a lower spring seat 17, which is installed around an outer circumference of the outer tube 12, and an upper spring seat (not shown), which is supported at a backside thereof by the mounting bracket at the upper end part of the piston rod 15, via a thrust bearing (not shown).

The hydraulic damper 10 has a shaft sealing part 20 constituted with an oil seal 23 and a rod guide 21 (with a bush 22) for the piston rod 15 to be inserted into the inner tube 13, and fixed between an upper end part of the inner tube 13 and an upper end part of the outer tube 12 in a later-described manner.

The hydraulic damper 10 has at the upper end part of the outer tube 12 a bump stopper 24 configured for a bump rubber (not shown) provided on the piston rod 15 to be brought into a hitting abutment thereon, to thereby define an end of the compression stroke. Further, the piston rod 15 is provided, on an insertion part thereof to the inner tube 13, with a rebound sheet 25 and a rebound rubber 26 configured to be brought into a hitting abutment on the rod guide 21, to thereby define an end of the expansion stroke.

The hydraulic damper 10 has combination of a piston valve device 30 and a base valve device 50 for generation of a damping force to damp vibrations in extension and compression of the piston rod 15 that occur when the suspension spring 18 absorbs an impact.

Figure 3:
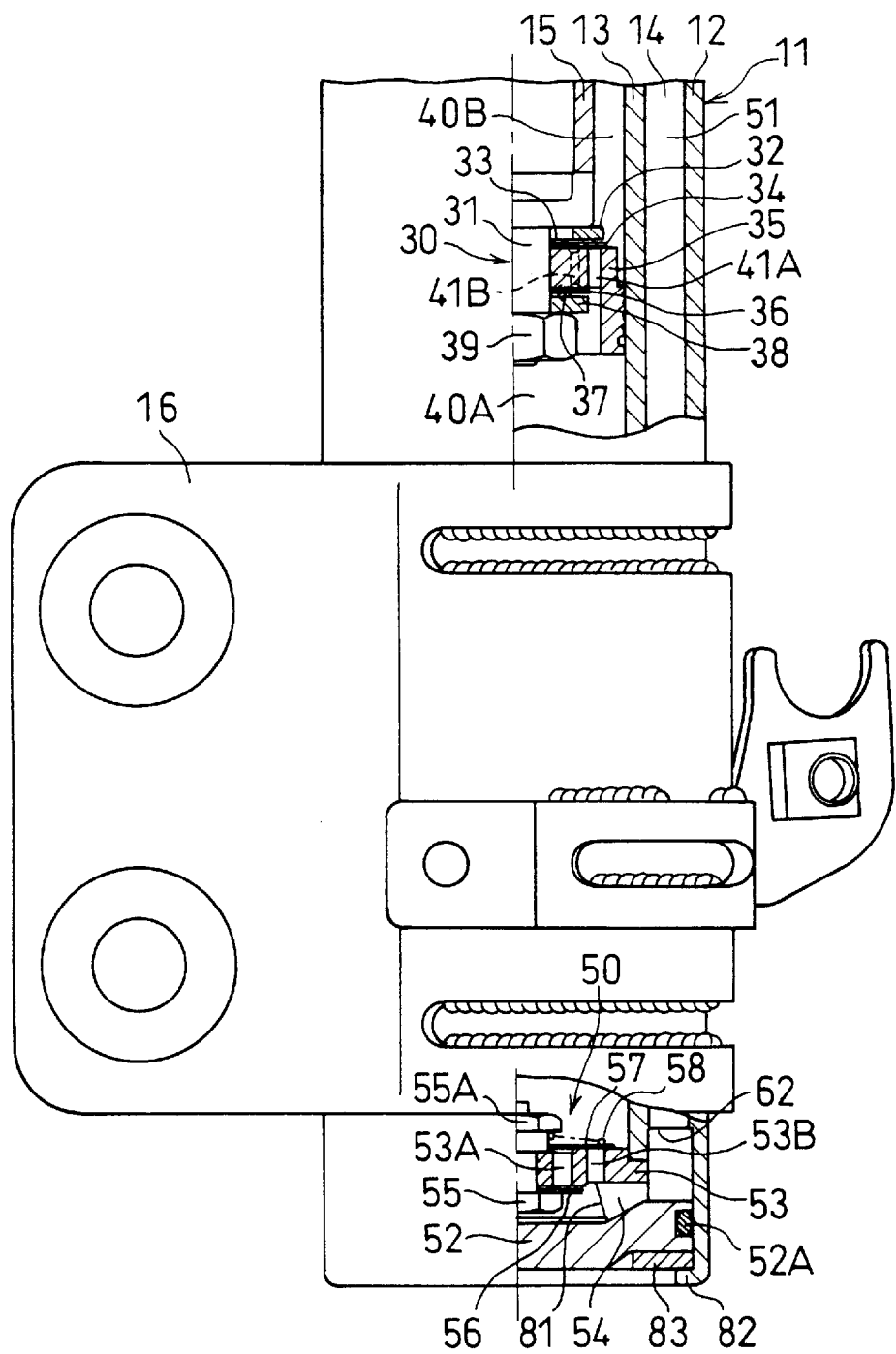
FIG. 3 is a detail of a lower end portion of the damper tube.

Piston Valve Device 30 (FIG. 1, FIG. 3)

As shown in FIG. 3, the piston valve device 30 is constituted with a valve stopper 32, a valve seat 33, a check valve 34, a piston 35, a disc valve 36, a valve seat 37, and a valve stopper 38, which are mounted on a piston mounting part 31 of the piston rod 15 and fixed thereto by a nut 39, and in addition, an outer end face of the piston rod 15 is tightened up to thereby fix the nut 39. The piston 35 is configured to separate an inside of the inner tube 13 into a piston side oil chamber 40A, where the piston rod 15 is not accommodated, and a rod side oil chamber 40B, where the piston rod 15 is accommodated, and is provided with a compression side flow path 41A and an expansion side flow path 41B allowing intercommunication between the oil chambers 40A and 40B. The compression side flow path 41A is opened and closed by the check valve 34, and the expansion side flow path 41B is opened and closed by the disc valve 36.

When the piston valve device 30 of the hydraulic damper 10 is compressed, hydraulic oil of the piston side oil chamber 40A passes the compression side flow path 41A, causing the check valve 34 to flex for deformation to open, and is conducted to the rod side oil chamber 40B. In expansion, hydraulic oil of the rod side oil chamber 40B passes the expansion side flow path 41B, causing the disc valve 36 to flex for deformation to open, and is conducted to the piston side oil chamber 40A, generating an expansion side damping force.

Base Valve Device 50 (FIG. 1, FIG. 3)

The hydraulic damper 10 has a gap between the outer and inner tubes 12 and 13, which is employed as a reservoir chamber 51, and its inside is separated into an oil chamber and a gas chamber. The base valve device 50 is constituted with combination of a cap 52 and an O-ring 52A for closing a lower end bottom of the outer tube 12 in a later-described manner, a bottom piece 53 fixed to a lower end part of the inner tube 13 in a later-described manner for separating the reservoir chamber 51 from the piston side oil chamber 40A, and a flow path 54 provided between the bottom piece 53 and the cap 52 to allow inter-communication between the reservoir chamber 51 and the piston side oil chamber 40A. The bottom piece 53 is applied with an inserted bolt 55 (with a nut 55A), and there are interposed a disc valve 56, a bottom piece 53, a check valve 57, and a spring 58 between the bolt 55 and the nut 55A.

When the hydraulic damper 10 is compressed, a volume of hydraulic oil that corresponds to a displacement of the piston rod 15 advancing in the inner tube 13 passes an opening of the check valve 57 and a flow path 53A of the bottom piece 53, causing the disc valve 56 to flex for deformation to open, and is pushed from the piston side oil chamber 40A to the reservoir chamber 51, via the flow path 53A of the bottom piece 53 and the flow path 54, generating a compression side damping force.

When the hydraulic damper 10 expands, a volume of hydraulic oil that corresponds to a displacement of the piston rod 15 retreating in the inner tube 13 pushes the check valve 57 to open, opposing the spring 58, and is supplied from the reservoir chamber 51 to the piston side oil chamber 40A, via the flow path 54 and the flow path 53B of the bottom piece 53.

With regard to the hydraulic damper 10, there will be described below the constitution of the damper tube 11, fixing structure of the shaft sealing part 20, and fixing structure of the bottom piece 53.

(A) Constitution of Damper tube 11 (FIG. 1 to FIG. 4)

Figure 4:
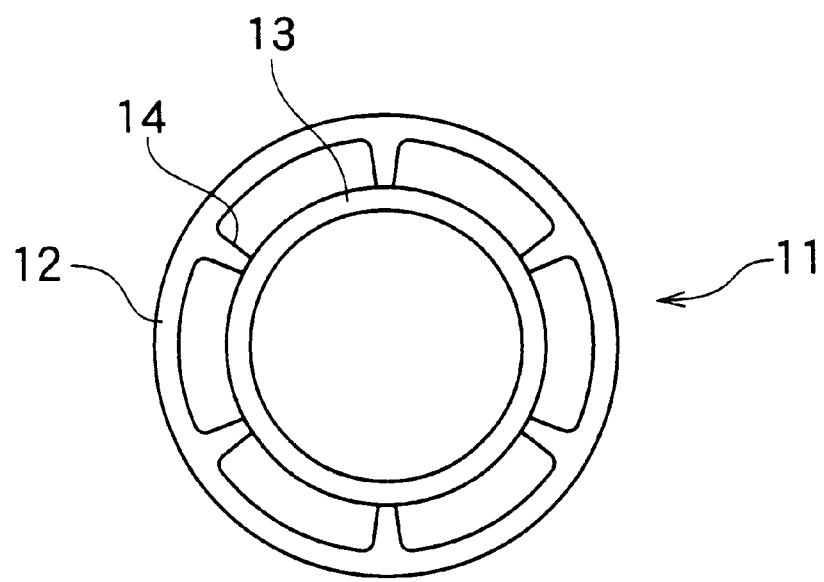
FIG. 4 is a cross section of the damper tube.

To make the damper tube 11, as shown in FIG. 4, an outer tube 12 and an inner tube 13 are separately formed by extrusion, and using this outer tube 12, as it has ribs 14 integrally formed on its inside wall, the inner tube 13 is inserted into the outer tube 12, and this outer tube 12 is forced to be reduced in diameter so that the ribs 14 are compression-joined at their distal ends onto the inner tube 13, whereby the outer and inner tubes 12 and 13 are integrally joined.

The ribs 14 are arranged, six in total in this embodiment, at equal intervals in a circumferential direction of the outer and inner tubes 12 and 13, and extended, axially, substantially over lengths of the outer and inner tubes 12 and 13, ranging from the upper end part of the inner tube 13 down to a prescribed length and from the lower end part of the inner tube 13 up to a prescribed length. The ribs 14 are configured to define, upside of an upper end face at the prescribed downward length from the upper end part of the inner tube 13, an annular continuous space 61 to be continuous in a circumferential direction between the outer and inner tubes 12 and 13 so that, at the shaft sealing part 20, when hydraulic oil scraped by the piston rod 15 via the bush 22 up to between an upside of the rod guide 21 and the oil seal 23 returns from an oil return path 21A of the rod guide 21 to the reservoir chamber 51, this oil is allowed to be evenly distributed without dispersion from the annular continuous space 61 to respective cells (six in total) of the reservoir chamber 51 which are divided by the ribs 14 between the outer and inner tubes 12 and 13. The ribs 14 are configured to define, downside of a lower end face at the prescribed upward length from the lower end part of the inner tube 13, an annular continuous space 62 to be continuous in a circumferential direction between the outer and inner tubes 12 and 13 so that, when the hydraulic damper 10 is compressed, hydraulic oil pushed out of the piston side oil chamber 40A via the flow path 53A of the bottom piece 53 and the flow path 54 is allowed to be evenly distributed without dispersion from the annular continuous space 62 to respective cells (six in total) of the reservoir chamber 51 which are divided by the ribs 14 between the outer and inner tubes 12 and 13.

The outer tube 12 and the inner tube 13 as well as the ribs 14 are integrally formed as molds of an aluminum alloy, for example, they are continuously molded by drawing or extrusion, to be cut in predetermined lengths.

Accordingly, this embodiment provides the following effects:

Because the inner and outer tubes 12 and 13 are integrally molded by using an aluminum alloy, the outer tube 12 is supported by the ribs on the inner tube 13, thus having an increased rigidity, thereby allowing for dimensions in diameter and thickness of the outer tube 12 to be reduced, and for the hydraulic damper 10 to be light-weight as a whole.

Figure 5:
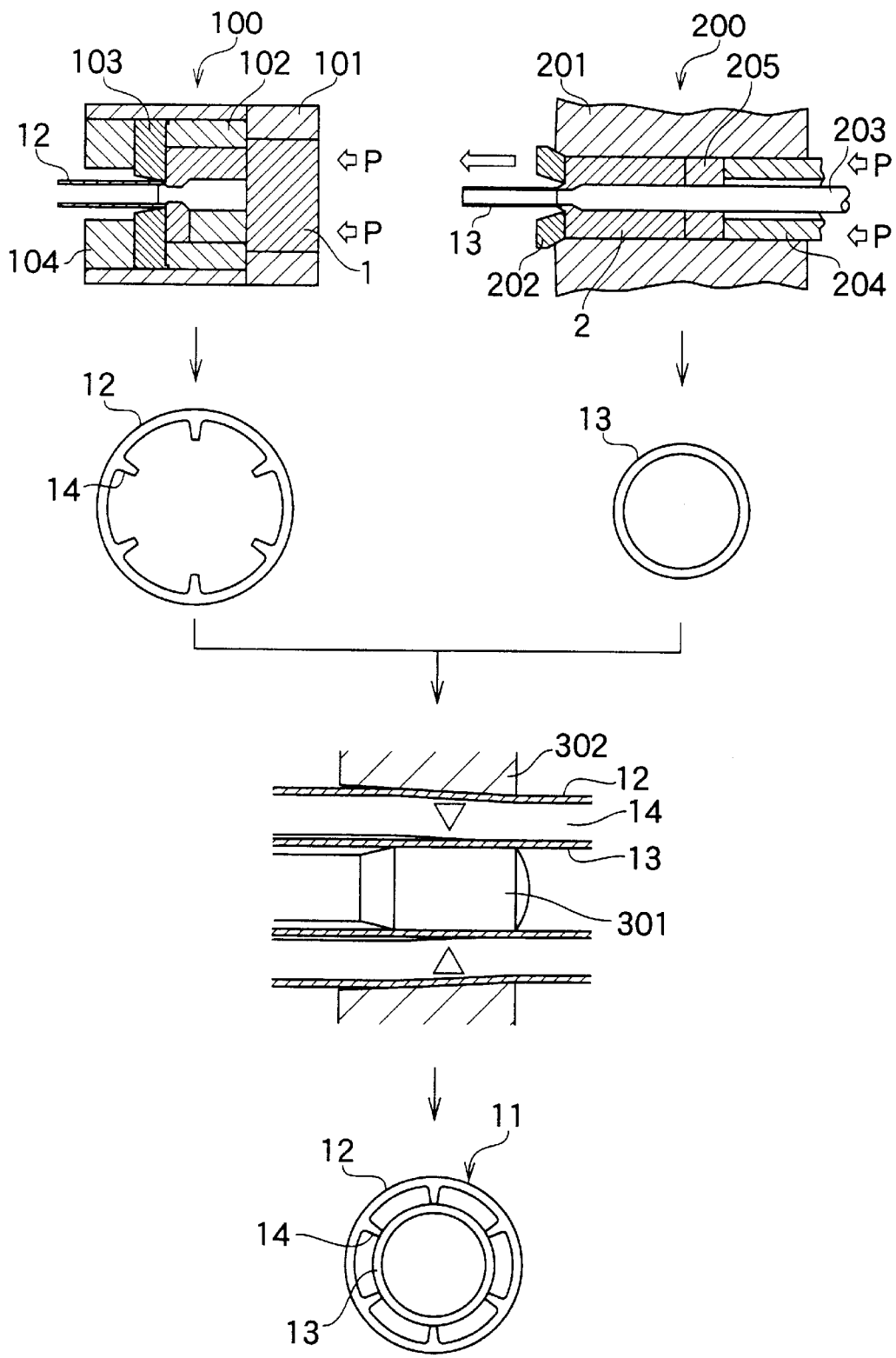
FIG. 5 is an illustrated flowchart of a manufacturing process of the damper tube.

The damper tube 11 is manufactured in the following procedures (FIG. 5).

(1) Outer tube forming process

Using a port hole extruder 100 (with a container 101, a male die 102, a female die 103, and a die packer 104), a billet 1 is extruded to have an outer tube 12 extruded in a form with ribs 14.

(2) Inner tube forming process

Using a mandrel extruder 200 (with a container 201, a die 202, a mandrel 203, a stem 204, and a disc 205), a billet 2 is extruded to have an annular inner tube 13 extruded in form.

In (1) and (2) above, the outer tube 12 and the inner tube 13 are formed so that a prescribed gap exists between an inside diameter of the ribs 14 at an inner circumferential wall of the outer tube 12 and an outside diameter of the inner tube 13.

(3) Joining process

Under a condition that the inner tube 13 is inserted inside the ribs 14 of the outer tube 12 with the above-noted gap in between, a core bar (plug) 301 is inserted inside the inner tube 13, and the outside diameter of the outer tube 12 is reduced by a die 302 in a diameter compressing manner, thereby compressing an inside diameter as well as the outside diameter of the outer tube 12, whereby the ribs 14 of the outer tube 12 are compression-joined onto the outside of the inner tube 13, so that the outer and inner tube 12 and 13 are integrally joined.

Figure 2:
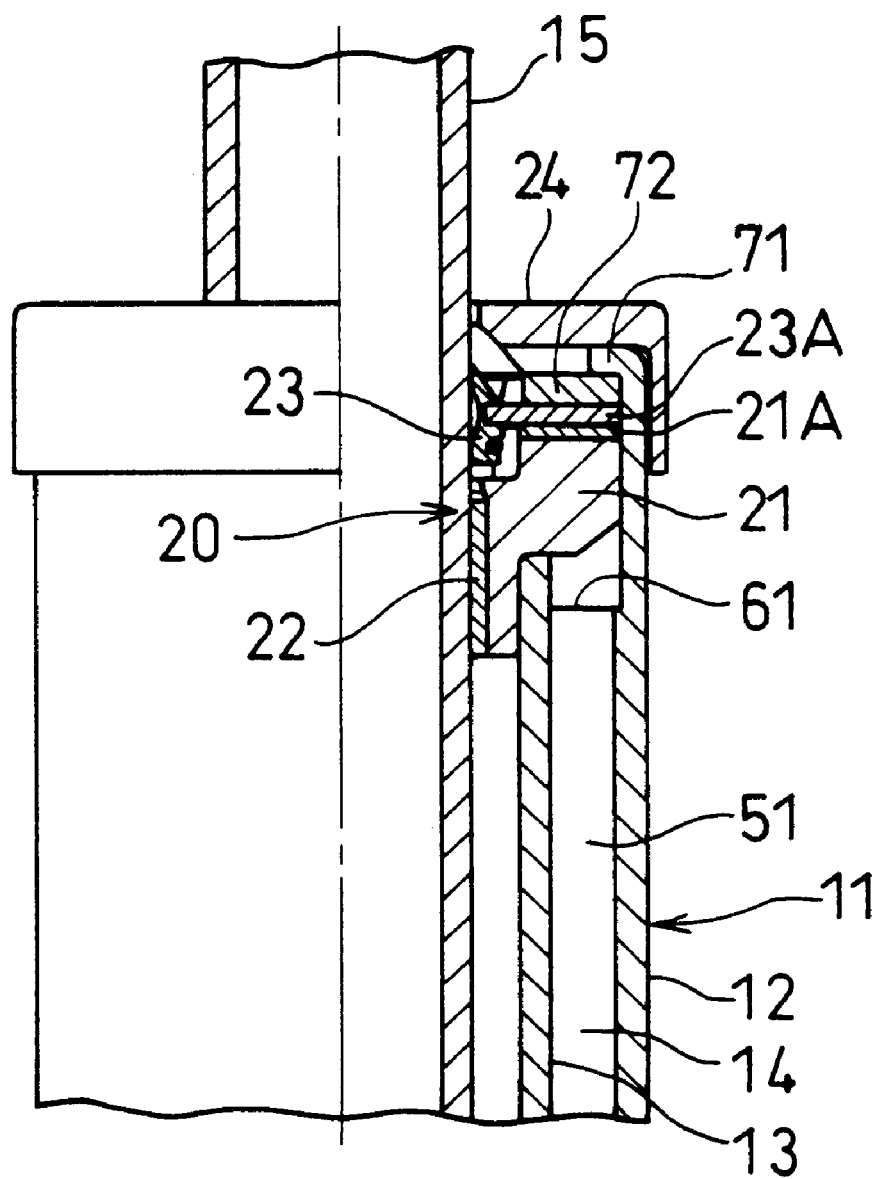
FIG. 2 is a detail of an upper end portion of a damper tube of the hydraulic damper.

(B) Fixing Structure of Shaft Sealing Part 20 (FIG. 2)

In the damper tube 11, the upper end part of the outer tube 12 is extended with a longer upward length than the upper end part of the inner tube 13, and the rod guide 21 (bush 22) and the oil seal 23 of the shaft sealing part 20 are fixed at a portion between the upper end part of the outer tube 12 and the upper end part of the inner tube 13. The rod guide 21 is fitted at a small outside diameter part on the lower end side thereof in the inside diameter of the inner tube 13 and at a large outside diameter part on the upper end side thereof in the inside diameter of the outer tube 12, having an upper stepped part of the small outside diameter part placed on an upper end of the inner tube 13, with the oil seal 23 and a washer 72 placed upside thereof, and in this condition, is fixed together with the oil seal 23 by a tightening part 71 at the upper end part of the outer tube 12.

In order to supplement an elastic force, the axial length of the upper end part of the outer tube 12 has been extended relative to the upper end part of the inner tube. The extended fraction of the axial length of the upper end part of the outer tube 12 exerts an elastic thrust force on the shaft sealing part 20. There is interposed a compression spring member 72 such as a disk spring within a range sandwiching the shaft sealing part 20 between the upper end part and the inner tube 13 and the upper end part of the outer tube 12. In this embodiment, the compression spring member 72 is pinched under pressure between the tightening part 71 of the outer tube 12 and a core metal 23A of the oil seal 23.

Accordingly, this embodiment provides the following effects:

The elastic thrust force that the outer tube 12 exerts on the shaft sealing part 20 becomes smaller as the extended fraction of the axial length of the upper end part of the outer tube relative to the upper end part of the inner tube 13 is reduced. This reduction of thrust force is compensated for by the compression spring member 72. In other words, the compression spring member 72 supplements the thrust force acting on the shaft sealing part 20, allowing for necessary thrust force to be maintained even with a different amount of thermal expansion between the outer tube 12 and the guide rod 21 of the shaft sealing part 20, or against the deterioration of a rubber member about the core metal constituting the oil seal 23 of the shaft sealing part 20, so that the shaft sealing part 20 is free of play.

(C) Fixing Structure of Bottom Piece 53 (FIG. 3)

In the damper tube 11, the lower end part of the outer tube 12 is extended with a longer downward length than the lower end part of the inner tube 13, and the bottom piece 53 and the cap 52 (with the O-ring 52A) are fixed at a portion between the lower end part of the outer tube 12 and the lower end part of the inner tube 13. The bottom piece 53 is fitted at a small outside diameter part on the upper end side thereof in the inside diameter of the inner tube 13 and at a lower stepped part of the small outside diameter part to a lower end of the inner tube 13, with a tapered seat face of a leg part 81 at a downside thereof centered to and seated on a recessed seat face of the cap 52, and in this condition, is fixed together with the cap 52 by a tightening part 82 at the lower end part of the outer tube 12, via a washer 83.

At this time, in order to supplement an elastic thrust force that an extended fraction of axial length of the lower end part of the outer tube 12 has relative to the lower end part of the inner tube 13 exerts on the cap 52 and the bottom piece 53, there is interposed a compression spring member 83 such as a disc spring within a range sandwiching the cap 52 and the bottom piece 53 between the lower end part of the inner tube 13 and the lower end part of the outer tube 12. In this embodiment, the compression spring member 83 is pinched under pressure between the tightening part 82 of the outer tube 12 and an end face of the cap 52.

Thereby, the bottom piece 53 is fixed by the following procedures (1) to (4):

(1) After a sufficient cleaning of the damper tube 11 (the outer tube 12 and the inner tube 13) in the assembly process of the hydraulic damper 10, fit the bottom piece 53 (as a sub-assembly with the bottom piece 53 having the disc valve 56, the check valve 57, and the spring 58 assembled thereto by the bolt 55 and the nut 55A) into the lower end part of the inner tube 13.

(2) Fit the cap 52 (with the O-ring 52A) in the lower end part of the outer tube 12, so that the seat face of the leg part 81 is seated on the cap 52, thereby holding the bottom piece 53 by the cap 52.

(3) Install the compression spring member 83 in position to abut on the cap 52 at the lower end part of the outer tube 12.

(4) Tighten the lower end part of the outer tube 12, so that the bottom piece 53, the cap 52, and the compression spring member 83 are pinched under pressure to be fixed between the lower end part of the outer tube 12 and the lower end part of the inner tube 13 by the tightening part 82.

It is noted that the compression spring member 83 may be interposed between the cap 52 and the bottom piece 53, in order for the cap 52 to be screw-fastened to or press-fitted in the lower end part of the outer tube 12 in the procedure (4) above.

Accordingly, this embodiment provides the following effects:

(1) The damper tube 11, in which the outer tube 12 and the inner tube 13 are compression-joined via the ribs 14 in an apparent integral form, is allowed to have a substantially equivalent strength to one in which they are completely integrally formed. It is noted that the outer tube 12 and the inner tube 13 are compression-joined, but not press-fitted, and are free of burrs nor metal scrape powder, without degradation in quality or reliability of the hydraulic damper 10.

(2) The outer tube 12 and the inner tube 13 are formed simply by provision of the ribs 14 to one and by a mere cylindrical formation of the other, with a great flexibility in formation size. Therefore, implementing the outer tube 12 to be small in diameter and thin of thickness with a necessary volume secured for the reservoir chamber 51 between the outer tube 12 and the inner tube 13, the damper tube 11 is still allowed to be compact in size.

(3) The outer tube 12 and the inner tube 13 are allowed to be made of an identical material (the same kind of metal) or different materials (different kinds of metal). For example, the outer and inner tubes 12 and 13 may be made of a 6000-series aluminum and a 2000-series aluminum, respectively, to thereby provide a damper tube 11 with an increased strength, permitting a lighter weight than a completely integrated damper tube, with a secured strength.

(4) The outer tube 12 and the inner tube 13 are not completely integrated, allowing for incorporated components (shaft sealing part 20, bottom piece 53, etc.) between the outer tube 12 and the inner tube 13 to receive a great resilient thrust force which the outer tube 12 produces at a full length. Therefore, there is no need of extra thrust force bearing means, such as a spring member.

(5) The ribs 14 have at their distal ends wide faces to be compression-joined, with increased areas to be compression-joined between the outer tube 12 and the inner tube 13, with an increased integral joining strength.

Further, this embodiment has the following effects:

(1) Because of integration between inner and outer tubes, although the elastic thrust force the outer tube 12 exerts on the bottom piece 53 becomes smaller as the shaft length the lower end part of the outer tube 12 has relative to the lower end part of the inner tube 13 is shorter, this reduction of thrust force is supplemented by the compression spring member 83. In other words, the compression spring member 83 supplements the thrust force acting on the bottom piece 53, allowing for a necessary thrust force to be maintained even with a difference in amount of thermal expansion between the outer tube 12 and the bottom piece 53, so that the bottom piece 53 is free of play.

(2) In the hydraulic damper 10 of a tube structure with integrated inner and outer tubes, after the bottom piece 53 is fitted in the inner tube 13, the cap 52 for holding the bottom piece 53 is tightened to the end part of the outer tube 12, to be fixed by screw-fastening or press-fitting. Therefore, it is unnecessary to apply a weld after the bottom piece 53 is incorporated into the inner tube 13, whereby the possibility of having welding spatters going inside the outer tube 12 is eliminated, allowing for the hydraulic damper 10 to be upgraded in quality.

(3) Because no welding is used to incorporate the bottom piece 53 or fixing the cap 52, such assembly work can be performed on an assembly line with a small possibility of invasion, for example by dust, allowing for the hydraulic damper 10 to be upgraded in quality.

It is noted that, in the hydraulic damper 10, an end part opposite to the nut 55A side of the bolt 55 to be inserted into the bottom piece 53 may be made as a thread part, and this thread part of the bolt 55 may be inserted via an O-ring into a hole provided in a central part of the cap 52, in order for a nut to be screwed on an end of the inserted part, to thereby provide a sub-assembly with the bottom piece 53 integrally fastened in advance to the cap 52. It also is noted that the bottom piece 53 may be integrated to the cap 52 by fitting (press-fitting) without using bolts, to provide a sub-assembly. In this case, the bottom piece 53 with the cap 52 fastened thereto is fitted in the lower end part of the inner tube 13 like the above-noted procedure (1), and concurrently therewith the cap 52 is fitted into the lower end part of the outer tube 12, then under this condition, the compression spring member 83 is installed in position to abut on the cap 52 at the lower end part of the outer tube 12 like the above-noted procedure (3), and the lower end part of the outer tube 12 is tightened like the above-noted procedure (4), so that the bottom piece 53, the cap 52, and the compression spring member 83 are fixed by this tightening part 82. Accordingly, by fastening the bottom piece 53 to the cap 52, there can be performed a lump incorporation of bottom piece 53 and cap 52, allowing for the number of assembly steps to be reduced.

Figure 6:
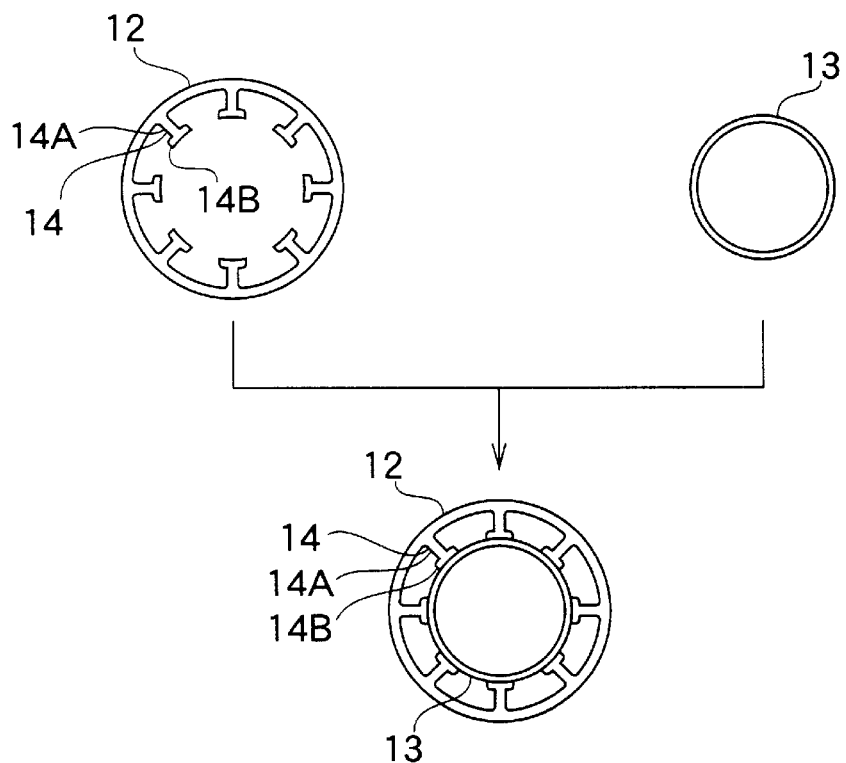
FIG. 6 is a cross section of the damper tube according to a second embodiment of the invention.

Second Embodiment (FIG. 6)

The second embodiment is different from the first embodiment in that a respective rib 14 integrally formed on an inner circumferential surface of an outer tube 12 has at a distal end of a rib body 14A thereof a wide compression-joint face 14B. The wide compression-joint face 143 is provided so as to be spread on both sides in a circumferential direction of the distal end of the rib body 14A, over a total length of the rib body 14A, having a flat face or arcuate face as the compression-joint face. Accordingly, by provision of an increased compression-joint area between ribs 14 of the outer tube 12 and an inner tube 13, their integration can have increased strength.

Figure 7:
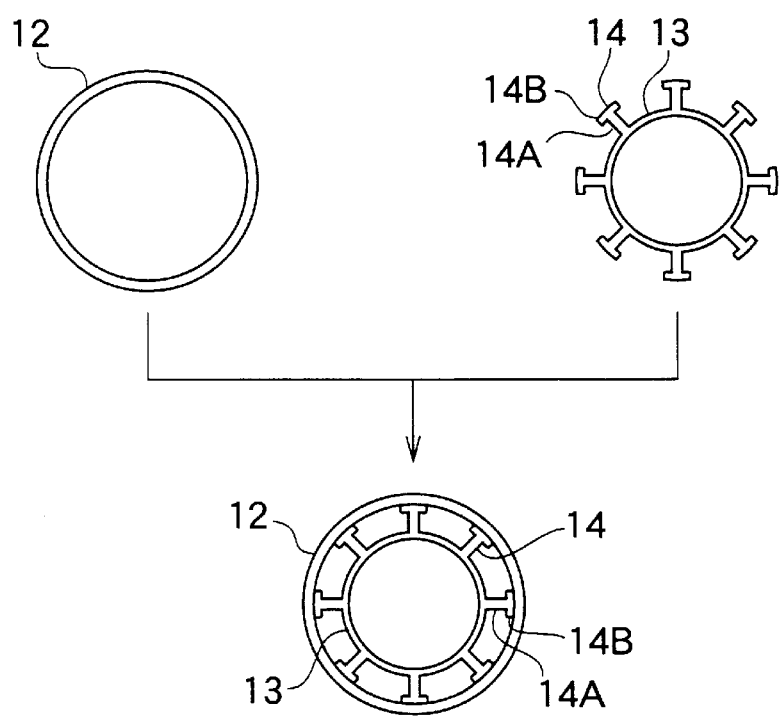
FIG. 7 is a cross section of the damper tube according to a third embodiment of the invention.

Third Embodiment (FIG. 7)

The third embodiment is different from the second embodiment in that, between an outer tube 12 and an inner tube 13, the inner tube 13 is integrally formed with ribs 14. In this case also, the ribs 14 have at distal ends of their rib bodies 14A wide compression-joint faces 14B. In a condition that the inner tube 13 is inserted inside the outer tube 12, the outer tube 12 is forced to be compressed in diameter, thereby compression-joining the outer tube 12 onto the distal ends (wide compression-joint faces 14B) of the ribs 14 of the inner tube 13, so that the outer tube 12 is integrally joined to the inner tube 13.

Figure 8:
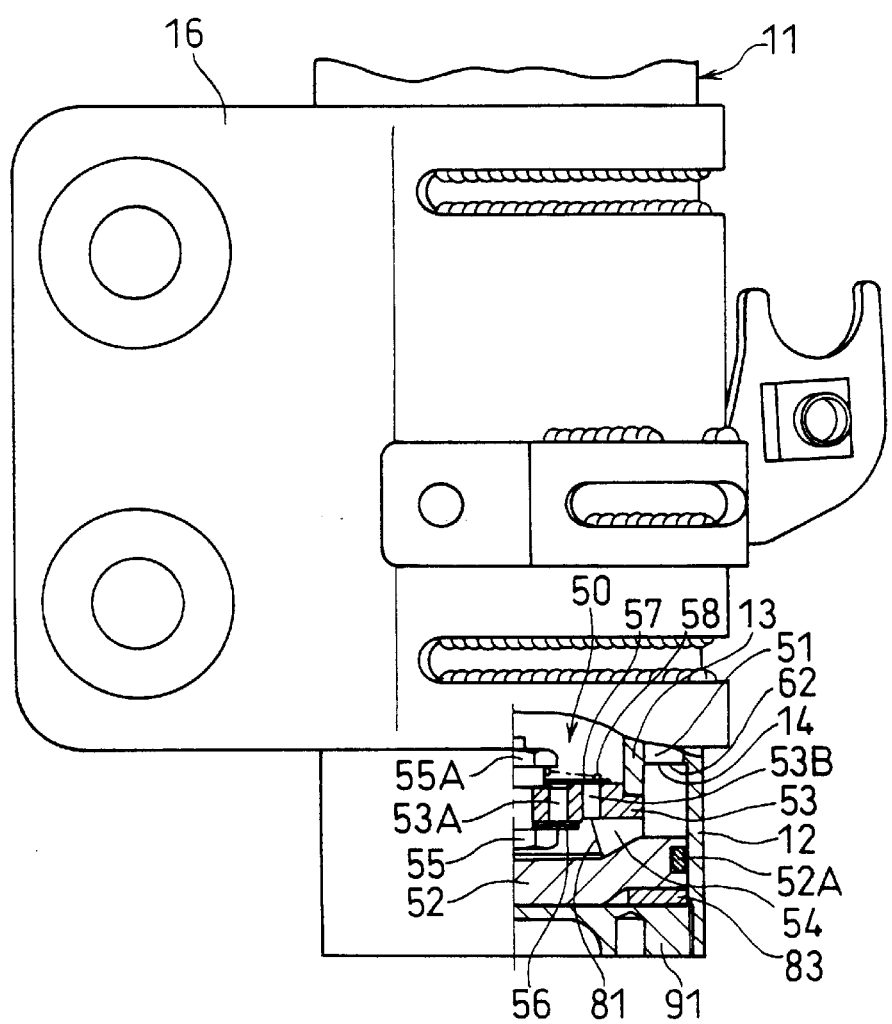
FIG. 8 is a detailed view of a lower end part of a damper tube of a hydraulic damper according to a fourth embodiment of the invention.

Fourth Embodiment (FIG. 8)

The fourth embodiment is different from the first embodiment in the fixing structure of a bottom piece 53.

In other words, in a damper tube 11, a lower end part of an outer tube 12 is extended with a longer downward length than a lower end part of an inner tube 13, and the bottom piece 53, a cap 52 (with an O-ring 52A), and a compression spring member 83 are fixed at a portion between the lower end part of the outer tube 12 and the lower end part of the inner tube 13. The bottom piece 53 is fitted at a small outside diameter part on the upper end side thereof in the inside diameter of the inner tube 13 and at a stepped lower part of the small outside diameter part to a lower end of the inner tube 13, with a tapered seat face of a leg part 81 at a downside thereof centered to and seated on a recessed seat face of the cap 52, and in this condition, with the cap 52 also fitted in the lower end part of the inner tube 13, is fixed by screw-fastening (which may be tightening or press-fitting) a fixing member 91 for holding the cap 52 and the compression spring member 83, to the lower end part of the outer tube 12.

Thereby, the bottom piece 53 is fixed by the following procedures (1) to (4):

(1) After a sufficient cleaning to the damper tube 11 (the outer tube 12 and the inner tube 13) in an assembly process of a hydraulic damper 10, fit the bottom piece 53 (as a sub-assembly with the bottom piece 53 having a disc valve 56, a check valve 57, and a spring 58 assembled thereto by a bolt 55 and a nut 55A) into the lower end part of the inner tube 13.

(2) Fit the cap 52 (with the O-ring 52A) in the lower end part of the outer tube 12, so that the seat face of the leg part 81 is seated on the cap 52, thereby holding the bottom piece 53 by the cap 52.

(3) Install the compression spring member 83 in position to abut on the cap 52 at the lower end part of the outer tube 12.

(4) Fasten by screwing the fixing member 91 to the lower end part of the outer tube 12, so that the bottom piece 53, the cap 52, and the compression spring member 83 are pinched under pressure to be fixed between the lower end part of the outer tube 12 and the lower end part of the inner tube 13 by the fixing member 91.

Accordingly, this embodiment has the following effects:

(1) In the hydraulic damper 10 of a tube structure with integrated inner and outer tubes, after the bottom piece 53 is fitted in the inner tube 13 and the cap 52 is fitted in the outer tube 12, the fixing member 91 for holding the cap 52 is tightened to the end part of the outer tube 12, in order for the bottom piece 53 to be fixed by screw-fastening or press-fitting to the inner tube 13. Therefore, it is unnecessary to apply a weld after the bottom piece 53 is incorporated into the inner tube 13, whereby the possibility of having welding spatters going inside the outer tube 12 is eliminated, allowing for the hydraulic damper 10 to be upgraded in quality.

(2) Because no welding is applied to incorporate the cap 52 of the bottom piece 53 or fixing the fixing member 91, such assembly work can be performed on an assembly line with a small possibility of invasion such as of dust, allowing for the hydraulic damper 10 to be upgraded in quality.

Figure 9:
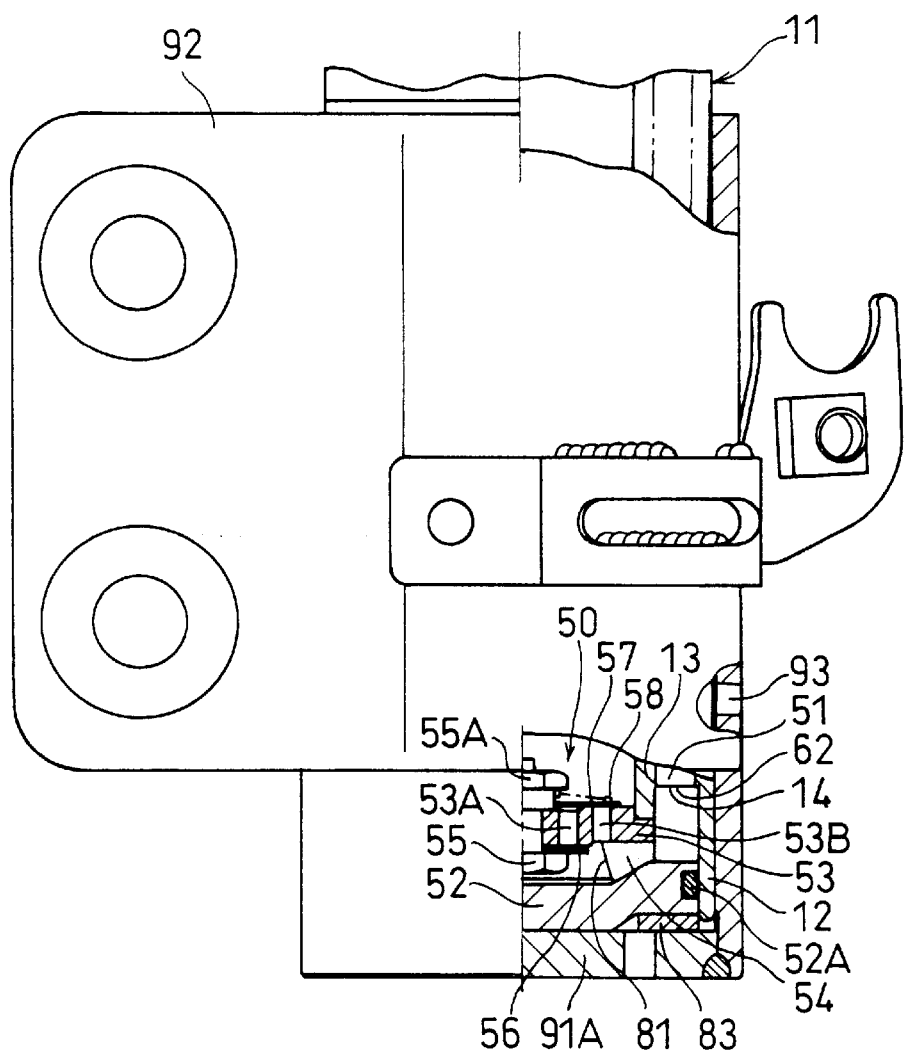
FIG. 9 is a detailed view of a lower end part of a damper tube of a hydraulic damper according to a fifth embodiment of the invention.

Fifth Embodiment (FIG. 9)

The fifth embodiment is different from the second embodiment in that a fixing member 91A substantially identical to the fixing member 91 is welded to a knuckle bracket 92, to be integrated thereto in advance in a separate process.

In this case, therefore, in the procedure (4) of the second embodiment, concurrently with the screw-fastening (which may be a press-fitting or tightening) of the knuckle bracket 92 to an outer circumference of an outer tube 12, the fixing member 91A for the bracket 92 is fastened to a lower end part of the outer tube 12, so that a bottom piece 53, a cap 52, and a compression spring member 83 can be pinched under pressure between the lower end part of the outer tube 12 and a lower end part of an inner tube 13, to be fixed by the fixing member 91A. The knuckle bracket 92 is fixed to the outer circumference of the outer tube 12 by a rotation stopper 93.

According to this embodiment, because the fixing of the knuckle bracket 92 to the outer tube 12 does not accompany a welding, it can be done on an assembly line.

Figure 10:
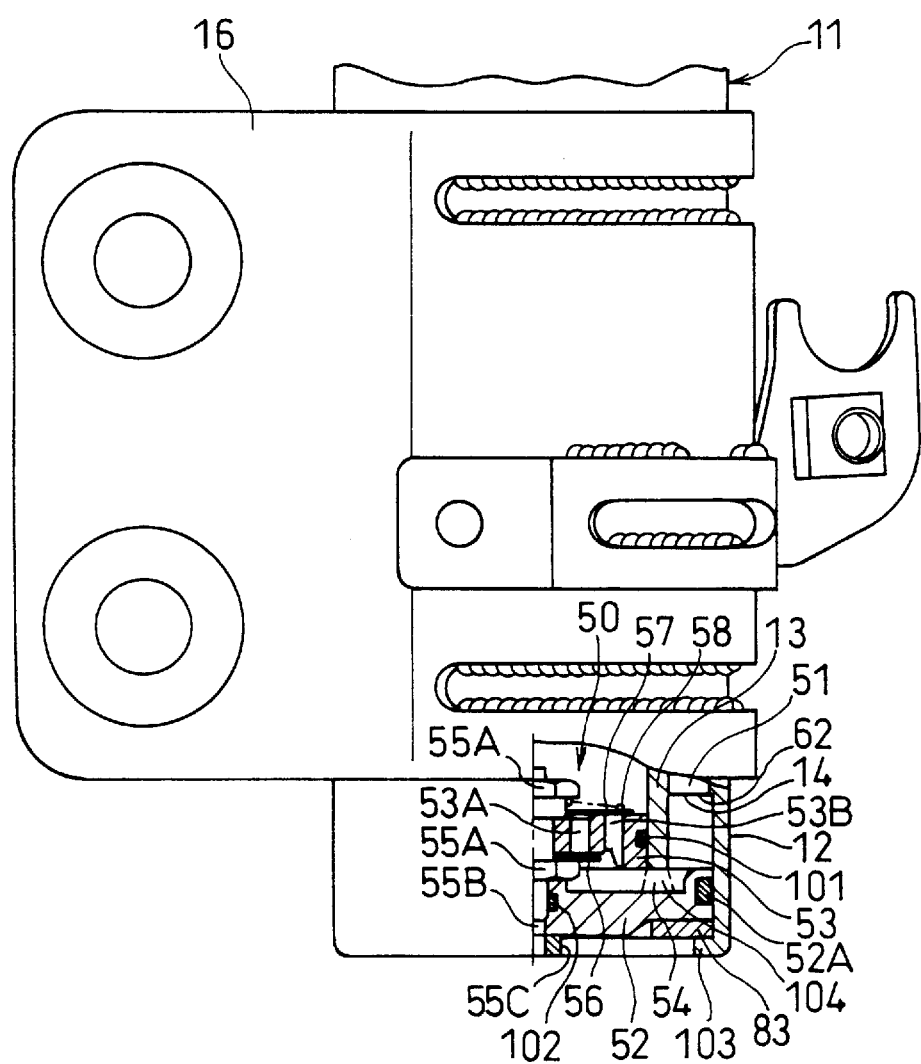
FIG. 10 is a detailed view of a lower end part of a damper tube of a hydraulic damper according to a sixth embodiment of the invention.

Sixth Embodiment (FIG. 10)

The sixth embodiment is different from the first embodiment in the fixing structure of a bottom piece 53.

In other words, in a damper tube 11, a lower end part of an outer tube 12 is extended with a long downward length, and a cap 52 (with an O-ring 52A) and a compression spring member 83 are fixed in advance by a tightening part 103 provided at the lower end of the outer tube 12. The bottom piece 53, in which an end part of a bolt 55 opposite to a nut 55A side is made as a thread part 55B, is inserted, in a condition with an O-ring 101 fitted on the outer circumference, from an upper end part of the outer tube 12, with the O-ring 101 in a sliding contact on an inside of the inner tube 13, to fit in the inner tube 13, and a thread part 55B of the bolt 55 is inserted via an O-ring 102 through a hole provided in a central part of the cap 52, in order for a nut 55C to be screwed on (which may be press-fitted or tightened to) an inserted end of the bolt 55, to be thereby fastened to the cap 52.

Thereby, the bottom piece 53 is fixed by the following procedures (1) to (3):

(1) After a sufficient cleaning of the damper tube 11 (the outer tube 12 and the inner tube 13) in an assembly process of a hydraulic damper 10, tighten the cap 52 together with the compression spring member 83 to the lower end part of the outer tube 12, to be fixed by this tightening part 103. The cap 52 comprises a die packer 104 and forms a flow-path 54.

(2) Insert the bottom piece 53 (as a sub-assembly with the bottom piece 53 having a disc valve 56, a check valve 57, and a spring 58 assembled thereto by the bolt 55 and the nut 55A), together with the O-ring 101, from the upper end part of the outer tube 12, for a fitting to the lower end part of the inner tube 13.

(3) Insert the thread part 55B of the bolt 55 fastened to the bottom piece 53, through the cap 52, and screw the nut 55C on the inserted end, so that the bottom piece 53 is fastened to the cap 52.

It is noted that the compression spring member 83 may be interposed between the cap 52 and the lower end part of the inner tube 13, and the cap 52 may be screw-fastened or press-fitted to the lower end part of the outer tube 12 in the above-noted procedure (1).

Accordingly, this embodiment has the following effects:

(1) In the hydraulic damper 10 of a tube structure with integrated inner and outer tubes, the bottom piece 53 is inserted from one end part of the outer tube 12 of which the other end part has the cap 52 fixed thereto, this bottom piece 53 is fitted in the inner tube 13, and this bottom piece 53 is fastened to the cap 52. Therefore, it is unnecessary to apply a weld after the bottom piece 53 is incorporated into the inner tube 13, whereby the possibility of having welding spatters going inside the outer tube 12 is eliminated, allowing for the hydraulic damper 10 to be upgraded in quality.

(2) Because no welding is applied to incorporate the bottom piece 53, this assembly work can be performed on an assembly line small in possibility of invasion, for example by dust, allowing for the hydraulic damper 10 to be upgraded in quality.

Figure 11:
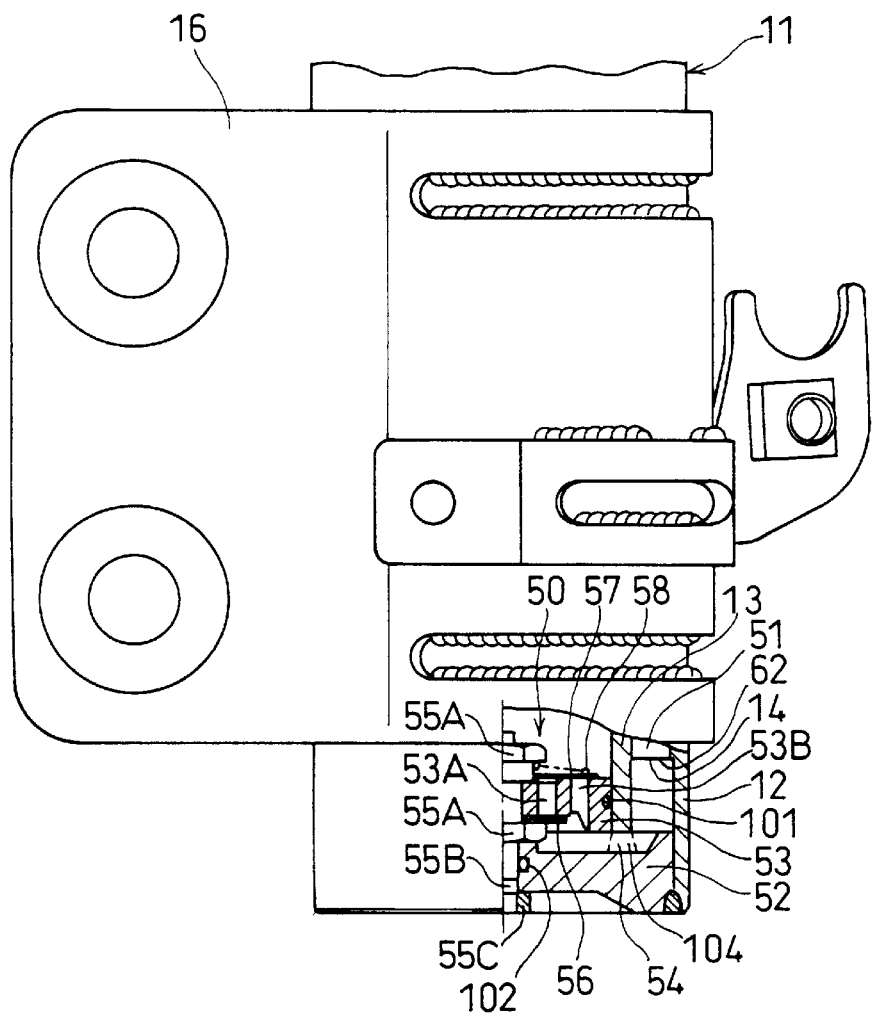
FIG. 11 is a detailed view of a lower end part of a damper tube of a hydraulic damper according to a seventh embodiment of the invention.

Seventh Embodiment (FIG. 11)

The seventh embodiment is different from the sixth embodiment in that a cap 52 is welded in advance to a lower end part of an outer tube 12, to be fixed thereto.

Figure 12:
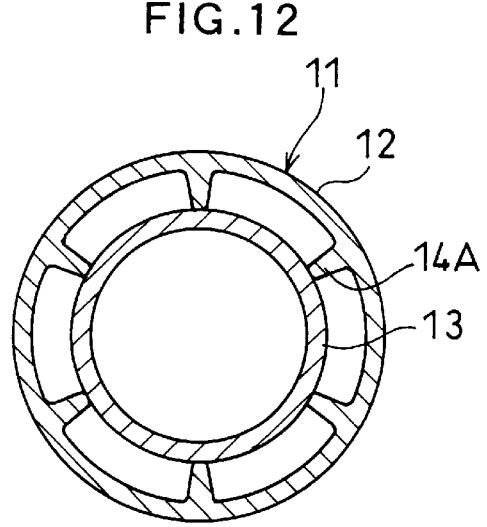
FIG. 12 is a cross sectional view of a modified damper tube.

While preferred embodiments of the present invention have detailed with reference to the drawings, the arrangement to be implemented according to the present invention is not limited to the embodiments described, and it is to be understood that design changes and variations may be made without departing from the summary of the invention. For example, the present invention is applicable to an any hydraulic damper having a tube structure with integrated inner and outer tubes, that may be one in which, as shown in FIG. 12, an outer circumferential wall of an inner tube 13 is tightened to or press-fitted in inside diameter parts of ribs 14A integrally formed on an inner circumferential wall of an outer tube 12, to be integrated thereto. The outer tube 12 and the inner tube 13 may not then be limited to an identical material, but may be of different materials.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A tube structure for a hydraulic damper of a double tube structure including an outer tube and an inner tube,
   wherein the outer tube and the inner tube are separately formed by extrusion, ribs are integrally formed on one of an inside wall of the outer tube and an outside wall of the inner tube, and a prescribed gap exists between an inside diameter of the ribs at an inner circumferential wall of the outer tube and an outside diameter of the inner tube, or between an outside diameter of the ribs at an outer circumferential wall of the inner tube and an inside diameter of the outer tube, and
   the inner tube is inserted inside the outer tube with said gap in between, the outer tube reduced in diameter to compression-join the ribs at the inner circumferential wall of the outer tube onto the outer circumferential wall of the inner tube, or to compression-join the ribs at the outer circumferential wall of the inner tube onto the inner circumferential wall of the outer tube, whereby the outer tube and the inner tube are integrally joined.

2. A tube structure for hydraulic damper at claim 1, wherein the inner tube is made of a first material and the outer tube and the ribs are made of a second material.

3. A tube manufacturing method for a hydraulic damper of a double tube structure including an outer tube and an inner tube, comprising the steps of:
   separately forming the outer tube and the inner tube by extrusion, with ribs integrally formed on one of an inside wall of the outer tube and an outside wall of the inner tube, and a prescribed gap exists between an inside diameter of the ribs at an inner circumferential wall of the outer tube and an outside diameter of the inner tube, or between an outside diameter of the ribs at an outer circumferential wall of the inner tube and an inside diameter of the outer tube; and
   inserting the inner tube inside the outer tube with said gap in between and inserting a core bar in the inner tube, diameter-reducing the outer tube to compression-join the ribs at the inner circumferential wall of the outer tube onto the outer circumferential wall of the inner tube, or to compression-join the ribs at the outer circumferential wall of the inner tube onto the inner circumferential wall of the outer tube; whereby the outer tube and the inner tube are integrally joined.

4. A tube manufacturing method for a hydraulic damper of claim 3, comprising the further step of removing said core bar after the outer tube and inner tube are joined.

* * * * *